US012558805B2

(12) United States Patent
Kassner et al.

(10) Patent No.: US 12,558,805 B2
(45) Date of Patent: Feb. 24, 2026

(54) INSULATOR APPARATUS AND METHOD FOR MONITORING

(71) Applicant: Metall + Plastic GmbH, Radolfzell (DE)

(72) Inventors: Thomas Kassner, Radolfzell (DE); Christian Heuer, Adligenswil (CH)

(73) Assignee: OPTIMA pharma containment GmbH, Radolfzell am Bodensee (DE)

( * ) Notice: Subject to any disclaimer, the term of this patent is extended or adjusted under 35 U.S.C. 154(b) by 145 days.

(21) Appl. No.: 18/688,628

(22) PCT Filed: Aug. 24, 2022

(86) PCT No.: PCT/EP2022/073536
§ 371 (c)(1),
(2) Date: Mar. 1, 2024

(87) PCT Pub. No.: WO2023/030984
PCT Pub. Date: Mar. 9, 2023

(65) Prior Publication Data
US 2025/0001623 A1 Jan. 2, 2025

(30) Foreign Application Priority Data

Sep. 2, 2021 (DE) ..................... 10 2021 122 772.0
Oct. 13, 2021 (EP) ..................... 21202453

(51) Int. Cl.
*B25J 19/02* (2006.01)
*B25J 21/02* (2006.01)

(52) U.S. Cl.
CPC .............. *B25J 21/02* (2013.01); *B25J 19/02* (2013.01)

(58) Field of Classification Search
None
See application file for complete search history.

(56) References Cited

U.S. PATENT DOCUMENTS 4,651,350 A * 3/1987 Dawiedczyk .......... A41D 19/01
2/163
4,774,727 A * 10/1988 Jackson ........... A41D 19/01547
2/168
(Continued)

FOREIGN PATENT DOCUMENTS

CN 112840233 A 5/2021
EP 2535650 B1 12/2016
(Continued)

OTHER PUBLICATIONS

Caldwell et al. Multi-modal tactile sensing and feedback (tele-taction) for enhanced tele-manipulator control, 1993, IEEE, p. 1487-1494 (Year: 1993).*
(Continued)

*Primary Examiner* — Mcdieunel Marc
(74) *Attorney, Agent, or Firm* — Bachman & LaPointe, P.C.

(57) ABSTRACT

The invention relates to an insulator apparatus (10), in particular for pharmaceutical and/or biotechnological applications, having a manipulation chamber (12), at least one work glove (14) insertable into the manipulation chamber (12), and a sensor (16) for detecting an inserted state of the at least one work glove (14), the at least one work glove (14) being insertable into an access opening (18) of the manipulation chamber (12) in an exchangeable manner and sealing the insulator apparatus (10) when inserted. The sensor (16) is disposed at a distance to the access opening (18) in the manipulation chamber (12) and connected to a detection unit (20), a detection area (22) of the sensor (16) comprising at least one operating area of the at least one work glove (14) in the area of the access opening (18), in particular a cross section having a diameter (D) of the access opening (18), in order to detect and to evaluate, by means of the detection
(Continued)

unit (20), at least a change and/or an operation of the at least one work glove (14) in the manipulation chamber (12).

17 Claims, 5 Drawing Sheets

(56)                    References Cited

U.S. PATENT DOCUMENTS

| | | | | |
|---|---|---|---|---|
| 4,779,289 | A * | 10/1988 | Prouty | A41D 19/00 |
| | | | | 2/161.6 |
| 5,706,522 | A * | 1/1998 | Ballarino | A41D 19/01558 |
| | | | | 2/163 |
| 9,578,907 | B2 * | 2/2017 | Wegner | A41D 19/01558 |
| 9,589,689 | B2 | 3/2017 | Fournier | |
| 2006/0150299 | A1 * | 7/2006 | Geng | A41D 19/0006 |
| | | | | 2/161.6 |
| 2018/0228229 | A1 * | 8/2018 | Shatzkes | A41D 19/01523 |
| 2019/0254368 | A1 * | 8/2019 | Gleser | A41D 19/01547 |
| 2020/0121364 | A1 * | 4/2020 | Johnson | A61B 17/54 |
| 2022/0324123 | A1 * | 10/2022 | Geiser | B25J 19/06 |

FOREIGN PATENT DOCUMENTS

| | | | |
|---|---|---|---|
| EP | 3771525 | A1 | 2/2021 |
| EP | 3815856 | A1 | 5/2021 |
| WO | 2010/132850 | A1 | 11/2010 |
| WO | 2016/147061 | A1 | 9/2016 |

OTHER PUBLICATIONS

Caldwell et al., Enhanced tactile feedback (tele-taction) using a multi-functional sensory system, 1993, IEEE, p. 955-960 (Year: 1993).*

Borik et al., Smart Glove to Measure a Grip Force of the Workers, 2019, IEEE, p. 383-388 (Year: 2019).*

Sagisaka et al., High-density conformable tactile sensing glove, 2011, IEEE, p. 537-542 (Year: 2011).*

International Search Report and Written Opinion dated Oct. 17, 2022 issued in corresponding application PCT/EP2022/073536.

European Search Report dated Mar. 18, 2022 issued in corresponding application EP21202453.3.

* cited by examiner

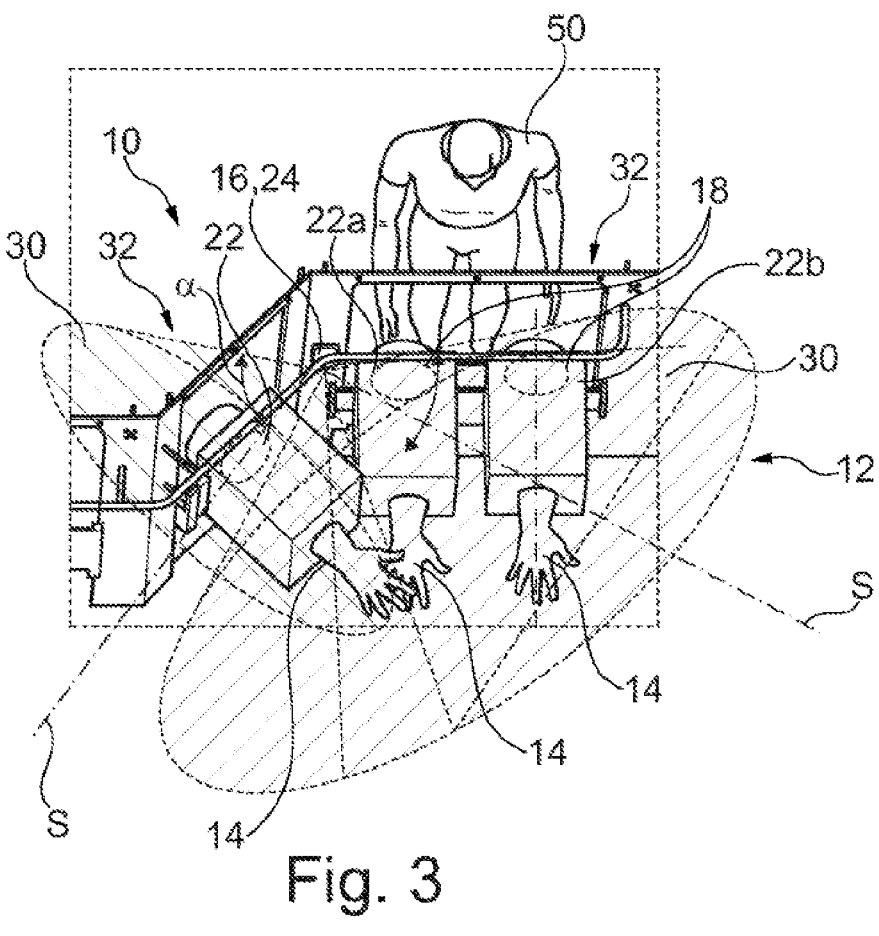
Fig. 3
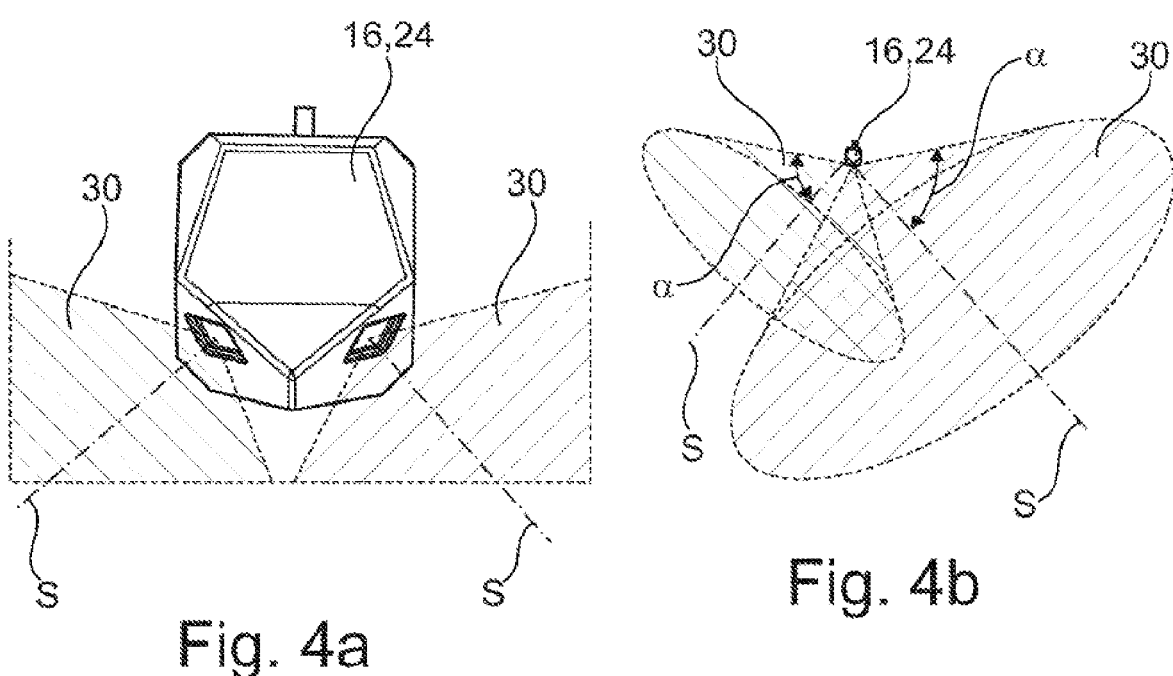
Fig. 4a
Fig. 4b

INSULATOR APPARATUS AND METHOD FOR MONITORING

BACKGROUND OF THE INVENTION

The present invention relates to an insulator apparatus, in particular for pharmaceutical and/or biotechnological applications and to a method for monitoring the insulator apparatus.

EP 2 535 650 B1 shows an insulator apparatus, in particular a decontamination arrangement for pharmaceutical applications, comprising a room to be decontaminated, in particular an insulator room, as well as a cleaning device for extracting gaseous and/or vaporous decontamination agents from the room air, in particular hydrogen peroxide. The room to be decontaminated is a biotechnical or pharmaceutical manipulation chamber, which can be accessed via work gloves firmly connected to the room. The work gloves are fixed, preferably in an exchangeable manner, to the side openings of the manipulation chamber in a sealing manner. Preferably, the insulator apparatus also has a handling chamber for pharmaceuticals and/or a filling chamber with a filling device, which are disposed within or adjacent to the manipulation chamber.

EP 3 771 525 A1 also discloses an insulator apparatus having a manipulation chamber and work gloves, in particular long-sleeve gloves, insertable into the manipulation chamber, the work gloves having an access device by means of which the work gloves are insertable into an access opening of the manipulation chamber. For the detection or registration of an inserted access device with work gloves in the insulator apparatus, the access device has sensor means, in particular RFID tags.

As an alternative to the arrangement of the sensor means in the access device, an RFID tag can also be disposed on a work glove for leakage testing.

The sensor means are therefore directly connected to the access device of the work gloves, which is why a type of special device or special gloves, in particular with a special coupling to a detection unit, are required for detection and registration. Accidental use of work gloves with a standard device without sensor means can therefore result in unauthorized operation of the manipulation chamber. Furthermore, the insulator apparatus can only be operated with these special devices.

In addition, sensor means that are fixed to the access device or the work gloves themselves are not suitable for detecting movement of the work glove. Therefore, for example, access in a prohibited area, in which hazardous goods are stored and/or automated processes, in particular for decontamination, are carried out, cannot be detected. An accidental and unsupervised access in such a prohibited area could lead to an operator being injured.

EP 3 815 856 A1 shows an arrangement for monitoring state and sequence of movement in an aseptic work chamber. At least one work glove projects into the work chamber, wherein the respective work glove is able to stretch up to a maximum grasping range in the three spatial axes in the work chamber. The arrangement comprises a tracking system, the recordings of which serve to localize the at least one work glove. In individual surface sections around machines, a prohibited region can be set up. The prohibited area with the at least one work glove must not be accessed.

U.S. Pat. No. 9,589,689 B2 shows an installation comprising: at least one insulated glove box; at least one glove port comprising a box ring integral with a wall of the glove box, said box ring being provided with a first radio frequency identification chip, said RFID chip comprising information on said box ring; at least two gloves including a new glove and a used glove, the at least two gloves each being provided with an RFID chip; a glove change device for changing gloves and an RFID reader. The new glove is configured such that it can be inserted into the glove change device in order to replace the used glove.

WO 2016/147061 shows a portable decontamination device for carrying out contamination-causing works at an object, which device comprises: a rigid frame with an object receiving opening; at least one closable material opening that leads to the working room and is designed for being hermetically connected to a material packaging; an air inlet and at least one air suction connection for the working room; at least two handling cavities that lead to the working room and that area designed for being hermetically connected to airtight handling gloves, for carrying out works in the working room.

SUMMARY OF THE INVENTION

The object of the present invention is to propose an insulator apparatus which, while avoiding the problems known from prior art, can detect a monitoring and/or an access, in particular to improve operating safety, independently of the choice of a work glove or its access device.

Furthermore, the object is to provide a method for monitoring the insulator apparatus.

Regarding the insulator apparatus, the object is attained by the features disclosed herein and, regarding the method, also by the features disclosed herein.

Advantageous embodiments are the subject of the dependent claims.

According to the invention, an insulator apparatus, in particular for pharmaceutical and/or biotechnological applications, is proposed, the insulator apparatus comprising a manipulation chamber, at least one work glove insertable into the manipulation chamber and sensor means for detecting an inserted state of the at least one work glove, the at least one work glove being insertable into an access opening of the manipulation chamber in an exchangeable manner and sealing the insulator apparatus when inserted. The sensor means are disposed at a distance to the access opening in the manipulation chamber and connected to a detection unit, a detection area of the sensor means, in particular imaging sensor means, comprising at least one operating area of the at least one work glove in the area of the access opening, in particular a cross section having a diameter of the access opening, in order to detect and to evaluate, by means of the detection unit, at least a change and/or an operation of the at least one work glove in the manipulation chamber.

In the context of the invention, the insulator apparatus is preferably understood to be a decontamination arrangement in which a defined ambient condition, similar to a clean room, can be established by introducing certain fluids, the insulator apparatus, in particular the manipulation chamber, being sealed off from environmental influences for this purpose. In order to nevertheless enable the operator to access the manipulation chamber, work gloves, in particular in the form of long-sleeve gloves, are preferably fixed to an insulator wall of the manipulation chamber, in particular the access opening. Preferably, the access opening, in which the work gloves are insertable in a sealing manner, is formed elliptically.

The operating area is preferably understood to mean a room section of the manipulation chamber adjacent to the work gloves, in which an operator can perform a possible working motion. In this context, the detection area is preferably understood to mean a two-dimensional or spatial viewing window of the sensor means around the operating area, this viewing window preferably being limited by software and forming a type of movement zone in which working motions can be detected. In the detection area, at least one diameter of the access opening and thus also a work glove in its full diameter or width can preferably be detected. As a result, a change, in particular an insertion or a removal of at least one work glove, and/or an operation of the work glove, in particular a handling for a production process, can preferably be detected.

Alternatively, the detection area can also comprise only a section of the at least one work glove, in particular a hand area of the at least one work glove, in order to preferably detect an operation of the work glove.

Surprisingly, the invention has recognized that by arranging the sensor means in the manipulation chamber at a distance to the access opening, the at least one work glove can be detected independently of its configuration or fixing, in particular by means of an access device. In particular, a change of the work glove can be registered and/or an access in the manipulation chamber by the operator can be detected. Advantageously, no markings or transmitting means hardware is/are required on the work glove, in particular special gloves. Rather, the sensor means according to the invention allow contactless and spaced monitoring of an access in the manipulation chamber. For example, a glove size or shape can be detected and registered, preferably stored. Furthermore, historical data of the insulator apparatus can be compiled from the access detection data.

The sensor means and the detection unit can interact particularly advantageously with a system control in order to enable safe operation of the insulator apparatus in particular. Thus, a decontamination or cleaning process can preferably only be carried out as soon as a work glove is inserted and/or no operation of the work glove is detected.

Preferably, the sensor means are imaging sensor means, which may be optical sensor means, in particular optical cameras, or imaging sensor means based in particular on light, laser, ultrasound or radar radiation. The imaging sensor means preferably differ from simple light barriers in that at least a two-dimensional detection of an object, in particular of at least one work glove, in the area of the access opening is possible.

Further preferably, the detection unit has filter means, preferably analog and/or digital filter means, in particular computer-based or software-based, which are formed to limit the detection area and/or to set a threshold value for movement detection. Preferably, the filter means, preferably as a type of software-based limiting means, can be used to limit the detection area as a spatial viewing window of the sensor means from recorded sensor data using software technology in order to form a type of movement zone or an area of interest in which operating movements can preferably be detected. This allows moving objects outside the area of interest to be masked out and excluded from detection by software filtering. Furthermore, the filter means can be used to filter out passively moving background objects, in particular objects suspended in the insulator apparatus with periodic movement, outside of the detection area.

The threshold value for movement detection can preferably be understood as a minimum movement speed and/or a minimum movement deflection and/or a deviation from a movement pattern. In particular, non-actuated work gloves and/or background objects in the detection area can also be set into a passive movement, in particular a periodic movement, by vibrations and/or fluid flows within the insulator apparatus. Such a background movement or oscillation can be understood as a movement pattern with a certain passive frequency spectrum or repetition rate, whereby an active operation of the work glove leads to a deviation from the passive frequency spectrum and can trigger a detection. Additionally or alternatively, an operation of the work glove can also be detected as soon as a minimum movement speed and/or minimum movement deflection is exceeded.

Preferably, the filter means can be pre-calibrated, in particular by taking into account calibration measurements in a manipulation chamber without work gloves and/or work gloves in an unaccessed state. Preferably, this allows the geometry of the manipulation chamber to be recorded and the detection of the work glove to be improved. Preferably, the sensor data is evaluable by the filter means in a frequency range, in particular by means of a Fourier transformation. In particular in the frequency range, a kind of passive background vibration of an inserted work glove not gripped by an operator can be filtered out.

Particularly preferably, the at least one work glove is formed as a long-sleeve glove and the detection area of the sensor means is directed towards at least one sleeve portion of the long-sleeve glove. This makes it possible to detect not only a change, in particular an insertion, of the work glove, but also an operation, in particular a deflecting movement of the work glove relative to a fastening position of the sensor means.

According to the invention, the sensor means are formed as at least one radar sensor, in particular temporally variable motion sensor data being evaluable by means of the detection unit in order to detect the at least one work glove. In particular by a pulse-echo measurement, an outer contour of the work glove, in particular in the area of the access opening, can be detected by evaluation of reflected electromagnetic radar waves; the at least one work glove reflecting radar waves to a recognizably different extent to the surrounding manipulation chamber, the radar waves being detectable by signal evaluation, in particular with the filter means, for stationary detection by means of the detection unit.

In addition, in particular by measuring a Doppler frequency shift of a reflected radar signal, a speed of movement of the at least one work glove relative to the mounting position of the at least one radar sensor can be determined. In connection with the detection unit, the at least one radar sensor can thus be formed both for object recognition and for detecting movements, in particular a speed and direction of movement. Preferably, the detection unit is designed such that in particular periodic movements, in particular due to an air flow within the manipulation chamber, are filtered, in particular with the filter means, in order to reliably detect an operating movement or a change of the at least one work glove.

Advantageously, radar sensors can be used reliably in a wide variety of environmental conditions and their suitability for monitoring in particular in connection with decontamination processes and/or production handling steps in the manipulation chamber has been recognized. Compared to optical sensor means, the radar sensors are advantageously not dependent on illumination of the manipulation chamber and are also functional if a field of view of the sensor means is restricted due to increased humidity, temperature and/or smoke development.

Preferably, the at least one radar sensor has at least one receiving antenna and at least one transmitting antenna, preferably four receiving antennas and three transmitting antennas, which are particularly preferably disposed on a circuit board, and wherein the at least one radar sensor is configured to generate a radar signal in a frequency range of preferably 60 GHz to 80 GHz.

In particular by using several receiving antennas and/or transmitting antennas, three-dimensional detection of the at least one work glove can also be made possible by suitable frequency modulation of a transmission signal. Preferably, however, the at least one work glove can already be detected with a continuous radar signal by measuring the speed.

In particular, the specified frequency range enables detection and/or detectable resolution of at least one work glove. The frequency range is preferably formed in such a way that the radar sensor can be disposed at a distance of 1 cm to 15 m from the access opening.

According to the invention, the at least one radar sensor is disposed in such a manner and/or configured in such a manner to generate a radar signal that an aperture angle of a radiation cone of the radar sensor covers the detection area for detecting the at least one work glove. In this context, it may be provided in particular that the radar sensor has a lens for focusing the radar beams. Further preferably, the aperture angle is adjustable, the aperture angle preferably being less than 50° to 80°, preferably less than 60°.

Preferably, the radiation cone can be limited to the detection area of individual work gloves by the filter means, in particular by software, particularly preferably by software limitation means of the detection unit.

According to the invention, the radiation cone of the at least one radar sensor is directed towards at least two work gloves, the detection unit comprising filter means, in particular software limitation means, for splitting the detection into at least a first detection area and a second detection area, in order to assign reflected radar signals to individual work gloves. Preferably, at least two work gloves are disposed next to each other for simultaneous engagement with both hands of the operator. Filter means can preferably be understood as analog and/or digital filter means, in particular computer- or software-based, the radar signal preferably being divided by the filter means with respect to a spatially expected distribution of the work gloves. Advantageously, several work gloves can be monitored independently of one another by means of just one radar sensor, in particular with one sensor element. Advantageously, the number of sensor elements can therefore be reduced.

In a further preferred embodiment, the at least one radar sensor is formed as at least two sensor elements disposed, preferably in pairs, in a housing in order to detect several access stations of the manipulation chamber and/or to detect several work gloves with one radar sensor, in particular at one mounting position. This allows a radar sensor to be formed so as to be particularly space-saving in the manipulation chamber, in particular an electronic supply of the radar sensor in the insulator apparatus also being designable easily.

In this context, it is preferred that a first sensor element and a second sensor element are disposed in the housing, the housing preferably being disposed between at least two access stations and/or at least two work gloves in the manipulation chamber.

For monitoring two access stations and/or two work gloves, the radiation cones of the two sensor elements preferably do not overlap in the detection areas of the individual access stations. Preferably, an evaluation of the recorded sensor data can be simplified and carried out according to known individual sensor elements. Alternatively or additionally, the radiation cones can also be limited by software using the filter means to avoid overlapping and/or the reflected radar signals can be filtered by software using the filter means according to the detection area to be detected.

Alternatively or additionally, an overlap of the radiation cone of the two sensor elements may be desired in order to additionally detect an intermediate third access station and/or an intermediate third work glove. Preferably, in this embodiment, three access stations and/or three work gloves can be detected with two sensor elements in one housing.

It is also conceivable that the resolution of the object to be detected can be improved by overlapping the radiation cones of the two sensor elements, in particular because the radiation cones detect the object to be detected from different angles of incidence and reduce potential shadowing.

Preferably, the at least one radar sensor is sealed against environmental influences in the housing, in particular a two-part stainless steel housing, the housing preferably having a cover element, in particular a protective glass, transparent to radar beams in order to cover a detection portion of the at least one radar sensor. The cover element is transparent to the emitted and received radar radiation and at the same time protects the radar sensor from environmental influences during a decontamination process. When using several sensor elements, several cover elements can also be used. In particular, the combined use of a metal housing that is resistant to environmental influences and a protective glass that is permeable to radar radiation can advantageously increase the service life of the radar sensor in a decontamination environment while at the same time increasing the detection function. The cover element is also preferably matched to the dimensions of the radar sensor and dimensioned in such a way that the radar beams are not disturbed by the housing itself. The housing is preferably formed in two parts and preferably has an O-ring for sealing two housing parts.

It is further preferably provided that the detection unit is connected to a system control in order to stop a manipulation process and/or output a warning signal when the at least one work glove is detected accessing a prohibited area of the manipulation chamber and/or in order to set environmental operating parameters for manual manipulation, the detection unit preferably having a storage unit to log the detected access.

The prohibited area can preferably be understood as a handling area and/or a filling area if automated processes, in particular filling processes, with moving machines are carried out in it and/or hazardous goods are stored and/or decontamination processes are carried out. Any access into such a prohibited area should therefore be monitored to avoid injury to the operator. Advantageously, imaging sensor means can not only detect an intrusion into the prohibited area as a kind of light barrier, but can also ensure safe movement within the prohibited area through refined detection.

For decontamination processes in particular, the entire manipulation chamber can represent a prohibited area, in which case the detection of an operating movement of the work glove immediately triggers a warning signal and/or an interruption of the decontamination process by the system control.

Preferably, a detection area of the sensor means can also be directed towards a hand area of the at least one work glove, in particular for localized prohibited areas, since the operator usually engages the prohibited area with the hand area first.

The detection unit comprises preferably at least one gateway in order to be connected to at least one sensor element of the sensor means, in particular the radar sensor, and a storage-programmable sensor control, several gateways being connected to the sensor control by means of a switch element. When using several sensor elements, in particular in a shared housing, these can each be connected to a gateway for data transmission. The individual gateways can then each be connected to a switch element in order to jointly transmit sensor data to the sensor control.

The invention further relates to a method for monitoring an insulator apparatus, in particular a previously described insulator apparatus, having a manipulation chamber with sensor means, an operator accessing the manipulation chamber with at least one work glove, in particular a long-sleeve glove, through at least one access opening and/or the operator inserting the at least one work glove into the access opening to seal the manipulation chamber, the sensor means being disposed at a distance to the access opening in the manipulation chamber and being connected to a detection unit.

The following process steps are listed in a preferred order for monitoring the insulator apparatus, although it is possible to deviate from this order in any way.

In a first step, a detection area of the sensor means, in particular of imaging sensor means, is directed towards at least one operating area of the at least one work glove in the area of the access opening, in particular a cross section with a diameter of the access opening, preferably a maximum diameter of an elliptical access opening. In a second step, reflected sensor signals are detected and evaluated by means of the detection unit. The insulator apparatus is then in a type of monitoring state. As soon as the at least one work glove is inserted, replaced or moved in a next step, this movement can be detected by means of the sensor means. Thus, in a third step, an inserting and/or operating movement of the at least one work glove, in particular a speed and/or path change with respect to a reference position of the work glove and/or with respect to an object-free detection of the operating area and/or a deviation from a passive movement pattern, in particular periodically oscillating movement pattern, is detected. Preferably, an inserting or exchanging of the at least one work glove can take place from a comparison with a reference measurement of the object-free background of the manipulation chamber.

For monitoring the insulator apparatus, the sensor means are formed as at least one radar sensor according to the invention and the at least one radar sensor is disposed in the manipulation chamber such that and/or a radar signal is generated, in particular by selecting a suitable wavelength, such that a radiation cone of the radar sensor, in particular having at least one radar antenna and at least one transmitting antenna, covers the detection area.

According to the invention, for monitoring an insulator apparatus with at least two work gloves, a radiation cone of the at least one radar sensor is first directed towards the at least two work gloves and, in a preferred subsequent second step for evaluation by means of the detection unit with filter means, in particular software-based limiting means, divided into at least two detection areas in order to assign backscattering radar signals to the individual work gloves. Filter means can be understood as analog and/or digital filter means, in particular computer- or software-based, the radar signal preferably being divided by the filter means with respect to a spatially expected distribution of the work gloves and being forwarded to the detection unit for evaluation of a detection of the individual work glove.

In a further preferred variation of the method for monitoring the insulator apparatus, a signal detected by the detection unit is sent to a system control, preferably subsequently to a detection of the at least one work glove, in order to output a warning signal to the operator and/or to stop or restrict further, in particular automatic, operation of the insulator apparatus in the event of manual access of the at least one work glove into a prohibited area, in particular an automated machine process and/or a hazardous goods storage location and/or a decontamination process. Preferably, by restricting an automatic operation, a collision with a hand or an injury to the operator can be prevented.

Additionally or alternatively, it would be conceivable that the detection of the at least one work glove and the coupling of the detection unit with the system control could also be used to set environmental operating parameters in the manipulation chamber, in particular a lighting setting and/or fluid flows, depending on the access. In a further step of the method, the sensor signal detected by the detection unit is particularly preferably stored in the storage unit to log the detected access.

In particular, in order to carry out the method steps described so far, a computer program with program code means is used, which is stored on a computer-readable data carrier and carries out the steps of the method when the computer program product is executed on a computer or on a corresponding computer unit, in particular a system control and/or a detection unit.

Particularly preferably, the invention also relates to a computer program having program code means, the computer program being stored on a computer-readable data carrier, in particular to perform all steps of a previously mentioned method when the computer program product is executed on a computer or on a corresponding computer unit, in particular a system control and/or a detection unit, according to a previously mentioned computer-based system.

BRIEF DESCRIPTION OF THE DRAWINGS

Further advantages and details of the invention can be derived from the following description of preferred embodiments of the invention, as well as from merely schematic drawings.

FIG. 3: shows a view of the insulator apparatus according to FIG. 2 with radiation cone of the radar sensor, FIG. 4a, FIG. 4b: show a detailed view of the radar sensor according to FIG. 1, FIG. 5a, 5b: show detailed views of a sensor element of the radar sensor according to FIG. 4a and FIG. 4b, FIG. 6a to FIG. 6e: show views of the housing of the radar sensor according to FIG. 4a and FIG. 4b, FIG. 7: shows a circuit diagram of a detection unit of the radar sensor according to FIG. 1.

Identical elements or elements with the same function are marked with the same reference numbers in the figures.

DETAILED DESCRIPTION

Figure 1:
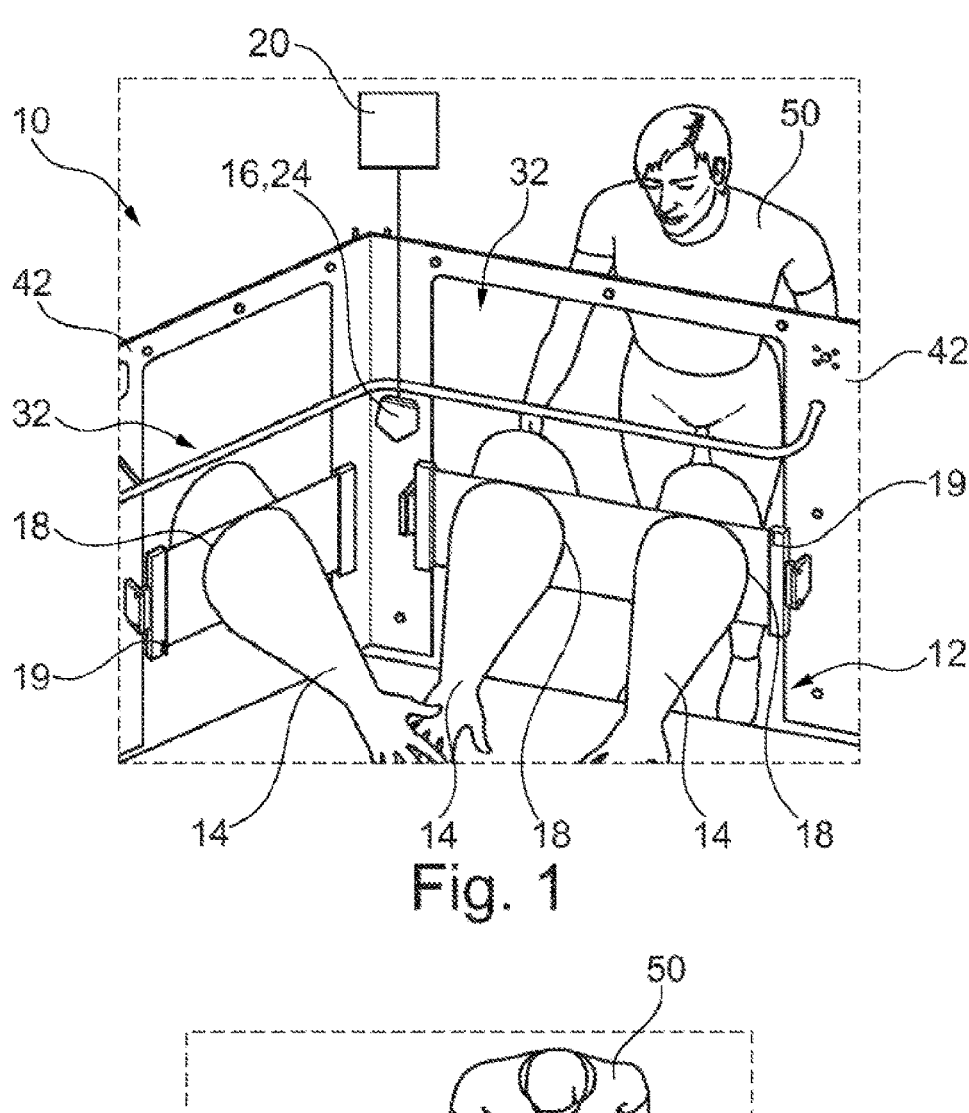
FIG. 1: shows a perspective view of an insulator apparatus with manipulation chamber, work gloves and radar sensor.

FIG. 1 shows an insulator apparatus 10, in particular for pharmaceutical and/or biotechnical applications, with a schematic view of an interior area of a manipulation chamber 12. Manipulation chamber 12 is in particular a space for decontamination processes, which is sealed off from the environment and contains a defined fluid flow and/or forms an access for a filling and/or a handling space. To provide manual access to an operator 50, work gloves 14 are disposed at each access opening 18 of manipulation chamber 12, in particular at lateral insulator walls 42. Work gloves 14 are preferably exchangeable and seal insulator apparatus 10 when inserted. As an example, two access stations 32 for operator 50 are shown, whereby an access can be carried out either by means of a single work glove 14 and/or two pairs of work gloves 14 disposed next to each other.

Preferably, work gloves 14 shown here are formed as long-sleeve gloves for the widest possible freedom of movement and a large operating area. It may further be preferred that work gloves 14 are insertable, in particular individually or in pairs, by means of an insert device 19 which includes access opening 18 for respective work glove 14.

For registering and/or detecting a change of a work glove 14, in particular inserting or removing insert device 19, and for detecting an access of an operator 50 into manipulation chamber 12, sensor means 16 are disposed at a distance to access opening 18, preferably between two access stations 32 on an insulator wall 42 and connected to a detection unit 20. Preferably, sensor means 16 are imaging sensor means which at least partially detect work glove 14 from a distance and in particular without contact.

Figure 2:
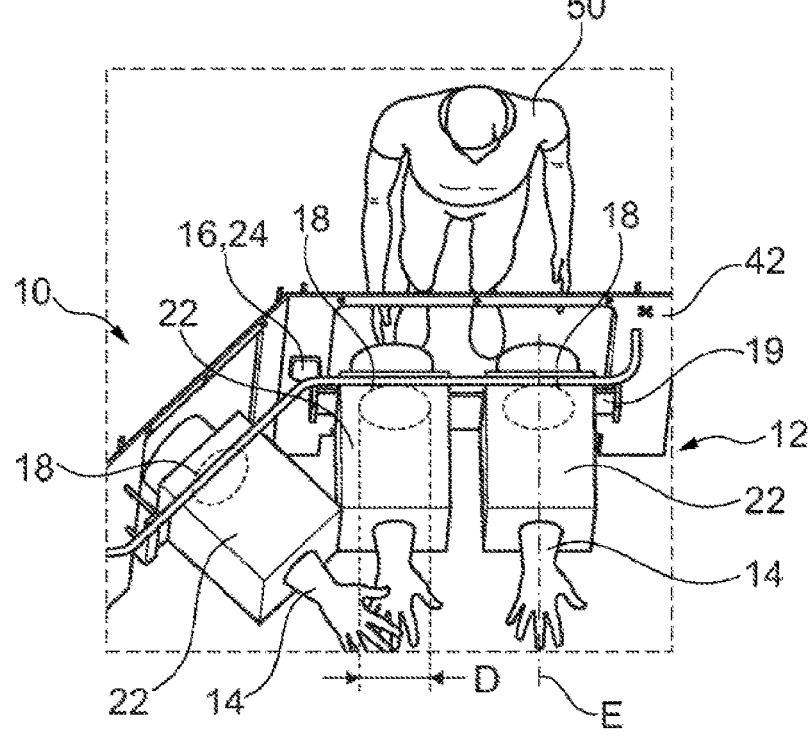
FIG. 2: shows a top view of the insulator apparatus according to FIG. 1 with detection area of the radar sensor.

In FIG. 2, a detection area 22 of sensor means 16 for shown work gloves 14 is shown schematically and box-like, detection area 22 comprising at least one operating area of shown work gloves 14 in the area of access opening 18. Preferably, detection area 22 comprises at least one cross section having diameter D of access opening 18, in particular a maximum diameter of an elliptical access opening, in order to be able to detect at least a change and/or an access within access opening 18. The operating area is understood to be a room section adjacent to work gloves 14, in which operator 50 can perform a possible working motion. For work gloves 14, which are shaped as long-sleeve gloves in the present case, detection area 22 preferably also comprises a sleeve portion and is aligned along an extension axis E of work glove 14, extension axis E preferably being perpendicular to a plane of access opening 18 and extending through a center point of access opening 18. Preferably, detection area 22 is limited by software with filter means of the detection unit, in particular with software limitation means, and forms a spatial viewing window of sensor means 16 as a type of movement zone or a spatial area of interest in which operating movements of work glove 14 can be detected. This allows moving objects outside the area of interest to be masked out and excluded from detection by software filtering. Furthermore, the filter means can also be used to filter out moving background objects, in particular in the insulator apparatus and suspended objects with periodic movement (not shown), outside, in particular also inside, of the detection area.

Sensor means 16 may be imaging sensor means, in particular based on optical detection by means of cameras or the measurement of laser, ultrasonic or radar radiation. However, optical detection in particular can be strongly influenced by decontamination processes within insulator apparatus 10, e.g., by changing environmental conditions regarding humidity, temperature and lighting, which is why reliable monitoring using optical methods can be problematic. In a preferred embodiment of the present invention, sensor means 16 are therefore formed as radar sensors 24, which enable reliable monitoring essentially irrespective of the ambient conditions.

In FIG. 3, FIG. 4a and FIG. 4b, sensor means 16 are shown in detail as radar sensors 24 with a radiation cone 30 to visualize emitted radar signals or radar waves. Radar sensor 24 is disposed in such a manner and/or configured in such a manner to generate a radar signal that an aperture angle α of radiation cone 30 covers box-like detection area 22, at least in the area of access opening 18, to detect at least one work glove 14. Radiation cone 30 is formed around a radiation axis S with an aperture angle α, preferably of less than 50° to 80°, particularly preferably less than 60°.

Radar sensor 24 shown in FIG. 4a and FIG. 6a to FIG. 6e is preferably formed as sensor elements 17 disposed in pairs in a housing 28 in order to detect in particular two access stations 32 of manipulation chamber 12 and work gloves 14 by means of a radar sensor 24.

Two radiation cones 30 of two sensor elements 17 are preferably formed and/or directed such that a possible overlap of radar signals does not occur within detection areas 22 of two access stations 32 and/or work gloves 14 in order to simplify an evaluation of reflected radar signals.

Alternatively or additionally, two radiation cones 30 can also be limited by software using the filter means to avoid overlapping and/or the reflected radar signals can be filtered or limited by software according to detection area 22 to be detected.

Alternatively, it would be conceivable that two radiation cones 30 overlap precisely in a detection area 22 and a resolution of the object to be detected can be improved by utilizing differently aligned radiation axes S. In this context, it would also be conceivable that further radar sensors 24 (not shown) are used in order to achieve the fullest possible detection of a work glove 14 and/or an access station 32. In this way, a kind of shadow area of a radar sensor 24 can also be detected.

Figures 5A, 5B:
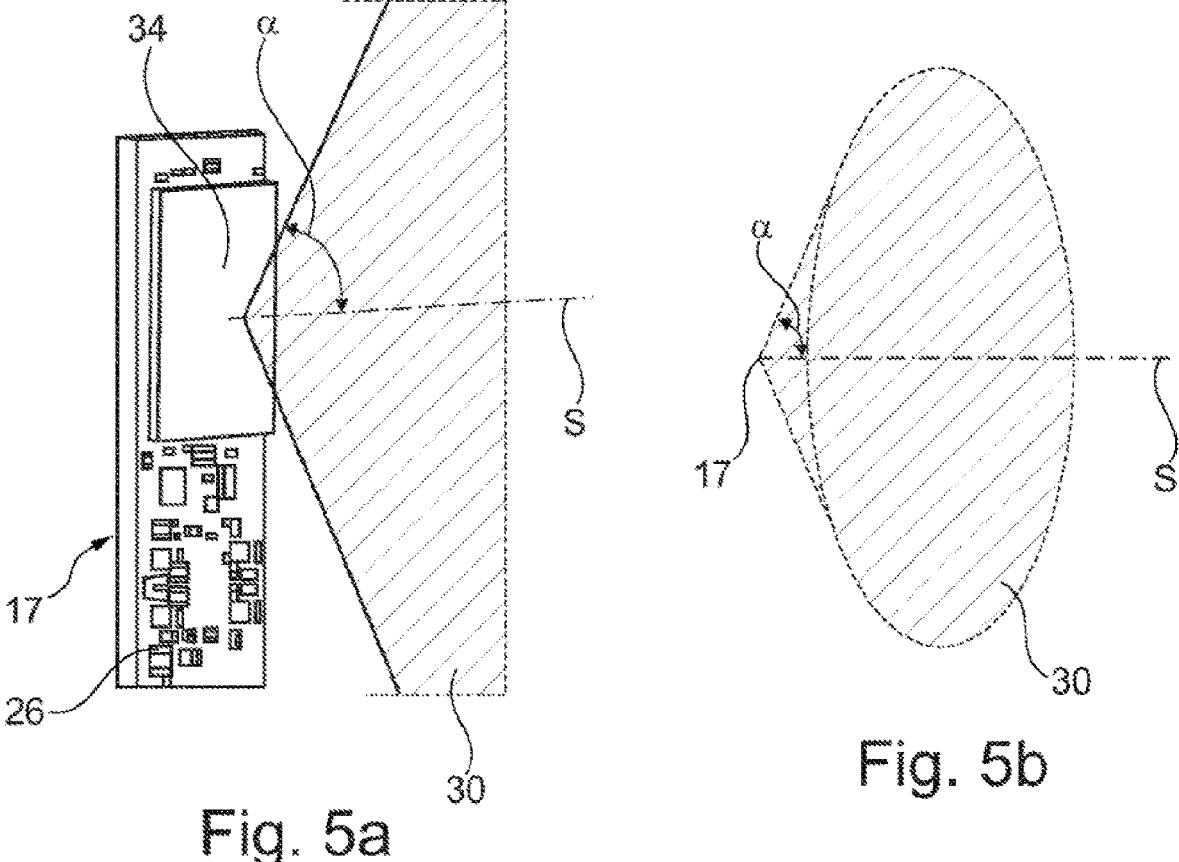
Figures 6A, 6B, 6C, 6D, 6E:
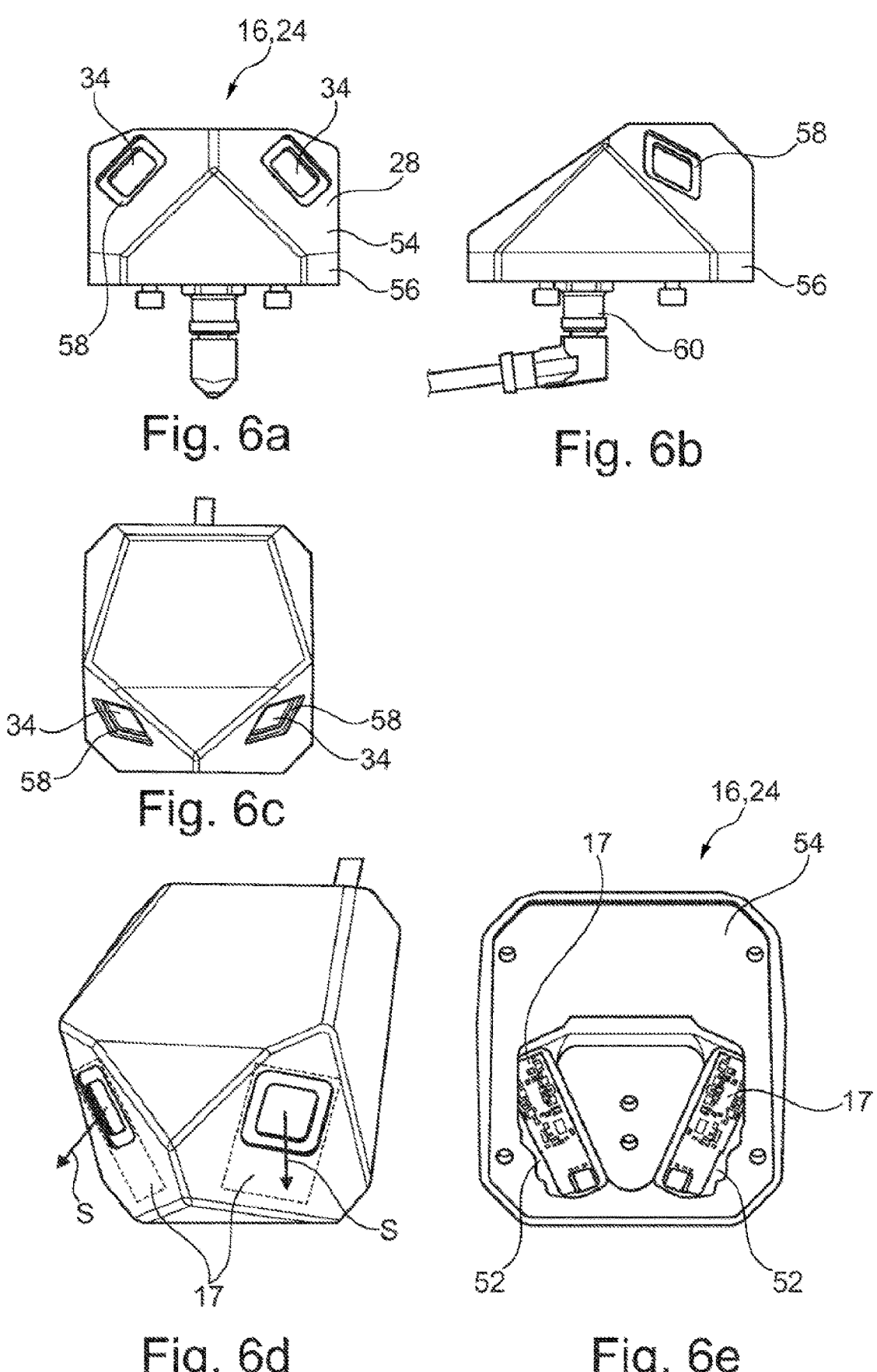

A sensor element 17 of radar sensor 24 is shown in FIG. 5a and FIG. 5b with a corresponding radiation cone 30 along radiation axis S, wherein radiation axis S is perpendicular to a detection portion 34, in particular a detection sensor surface. Preferably, sensor element 17 of radar sensor 24 has at least one receiving antenna and at least one transmitting antenna, preferably four receiving antennas and three transmitting antennas, which are preferably disposed on a circuit board 26 as shown. Such a sensor element 17 can be formed to generate radar signals in a frequency range of preferably 60 GHz to 80 GHz in order to be able to detect objects, in particular work gloves 14, at a distance of 1 cm to 15 m from radar sensor 24.

As further shown in FIG. 3, radiation cone 30 of at least one radar sensor 24 may be directed towards two work gloves 14, which are disposed in particular in pairs next to each other and formed for a two-handed access of operator 50. In this embodiment, detection unit 20 preferably has a filter means for splitting the detection into a first and a second detection area 22a, 22b in order to assign reflected radar signals to individual work gloves 14. The filter means can preferably be understood as analog and/or digital filter means, in particular computer- or software-based, wherein the reflected radar signals are preferably divided by the filter means with respect to a spatially expected division of work gloves 14, in particular divided into the desired two detection areas 22a, 22b. Advantageously, several work gloves 14 can thus be monitored independently of one another by means of only one radar sensor 24, in particular with one sensor element 17. The number of sensor elements 17 can thus be reduced advantageously.

Alternatively or additionally, it is conceivable that radiation cones 30 overlap in first detection area 22a in order to detect intermediate work glove 14 in first detection area 22*a* shown in FIG. 3. By overlapping radiation cone 30, the resolution in first detection area 22*a* and a differentiation from second detection area 22*b* can be improved.

As further shown in FIG. 6*a* to FIG. 6*e*, housing 28 of radar sensor 24 can be formed in two parts, whereby sensor elements 17 can be disposed in a top 54. Furthermore, housing 28 has receptacle portions 52, which are flattened and disposed according to a desired radiation direction along radiation axis S, for sensor elements 17. Particularly preferably, receptacle portion 52 has a cut-out for inserting a cover element 58, in particular a protective glass, which is permeable in particular to radar radiation. Cover element 58 covers and protects detection portion 34 of radar sensor 24, in particular of a sensor element 17. It would also be conceivable that cover element 58 is formed as a lens to focus the radar radiation. In particular due to the environmental conditions in a decontamination process, housing 28 is made of metal, in particular stainless steel, and/or of chemically resistant plastic to ensure a long service life of radar sensor 24, cover element 58 preventing a deflection or interference of the radar radiation. A cable receptacle 60 is disposed in bottom 56 to connect sensor elements 17 to detection unit 20. To protect two parts 54, 56 of the housing against environmental influences, they are sealed with an O-ring (not shown).

Figure 7:
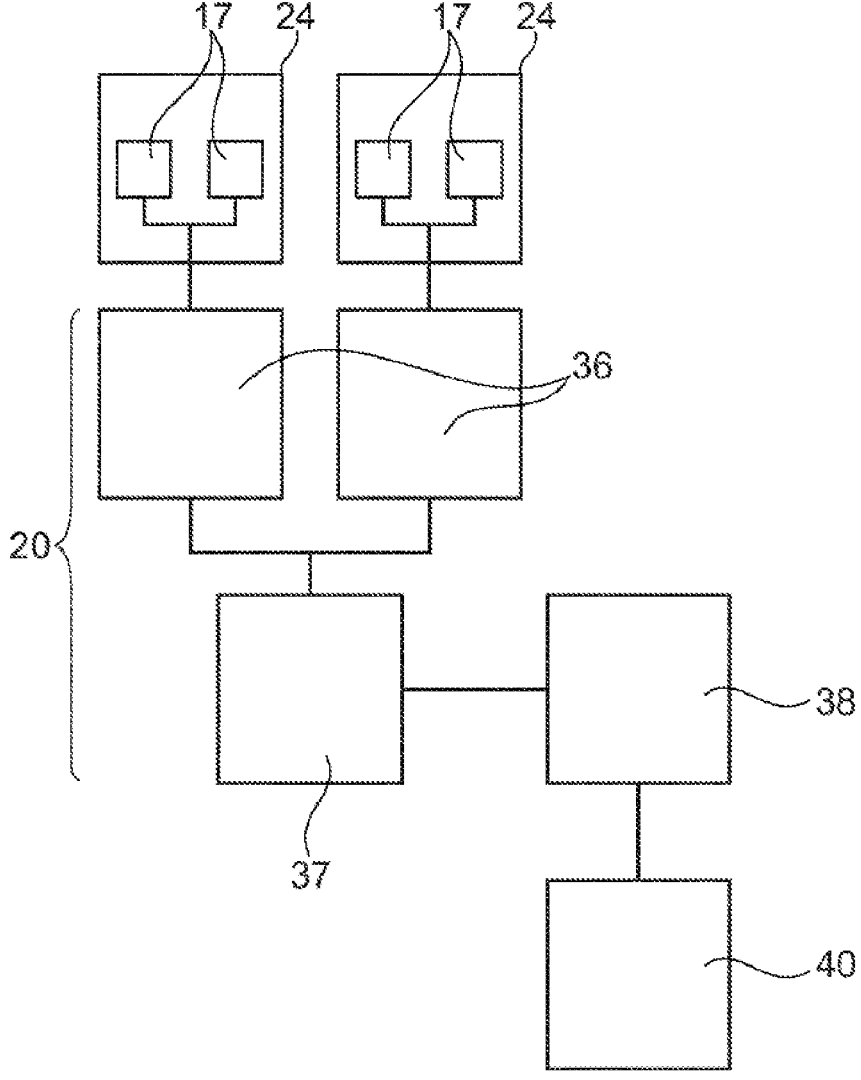

FIG. 7 shows an exemplary circuit arrangement, in particular for two radar sensors 24, each having two sensor elements 17 according to FIG. 6*a* to FIG. 6*e* and one detection unit 20. Each detection unit 20 preferably comprises one gateway 36 to connect two sensor elements 17, which in turn are connected to a sensor control 38 by means of a switch element 37. The sensor data of several sensor elements 17 can preferably be transmitted jointly to sensor control 38.

It would also be conceivable that detection unit 20, in particular sensor control 38, is connected to a system control 40 in order to stop a manipulation process and/or output a warning signal in the event of detected access of at least one work glove 14 into a prohibited area of manipulation chamber 12 shown in FIG. 1, and/or in order to set environmental operating parameters for manual manipulation. The prohibited area can preferably be a handling area and/or a filling area if automated processes, in particular filling processes, with moving machines are carried out in it and/or hazardous goods are stored and/or decontamination processes are carried out. In this context, detection unit 20 can have a storage unit (not shown) to log the detected access.

LIST OF REFERENCE SIGNS

10 insulator apparatus
12 manipulation chamber
14 work glove
16 sensor means
17 sensor element
18 access opening
19 insert device
20 detection unit
22 detection area
22*a*, 22*b* first and second detection area
24 radar sensor
26 circuit board
28 housing of the radar sensor
30 radiation cone
32 access station
34 detection portion of the sensor element

36 gateway
37 switch element
38 sensor control
40 system control
42 insulator walls
50 operator
52 receptacle portion of the housing
54 top of the housing
56 bottom of the housing
58 cover element of the housing
60 cable receptacle of the bottom
D diameter of the access opening
E extension axis of the work glove
S radiation axis of the sensor element

The invention claimed is:

1. An insulator apparatus (10) for pharmaceutical and/or biotechnological applications, the insulator apparatus having a manipulation chamber (12), at least one work glove (14) insertable into the manipulation chamber (12), and sensor means (16) for detecting an inserted state of the at least one work glove (14), the at least one work glove (14) being insertable into an access opening (18) of the manipulation chamber (12) in an exchangeable manner and sealing the insulator apparatus (10) when inserted, the sensor means (16) being disposed at a distance to the access opening (18) in the manipulation chamber (12) and being connected to a detection unit (20), a detection area (22) of the sensor means (16) comprising at least one operating area of the at least one work glove (14) in the area of the access opening (18), in particular a cross section having a diameter (D) of the access opening (18), in order to detect and to evaluate, by means of the detection unit (20), at least a change and/or an operation of the at least one work glove (14) in the manipulation chamber (12), wherein the sensor means (16) are formed as at least one radar sensor (24), temporally variable motion sensor data being evaluable by means of the detection unit (20) in order to detect the at least one work glove (14), the at least one radar sensor (24) being disposed in such a manner and/or being configured in such a manner to generate a radar signal that an aperture angle (α) of the radiation cone (30) of the at least one radar sensor (24) covers the detection area (22) for detecting the at least one work glove (14), the radiation cone (30) of the at least one radar sensor being directed towards at least two work gloves (14), the detection unit (20) having a filter means for dividing the detection into at least a first and a second detection area (22*a*, 22*b*) in order to allocate reflected radar signals to individual work gloves (14).

2. The insulator apparatus according to claim 1, wherein the detection unit (20) has filter means which are formed to limit the detection area (22) and/or to set a threshold value for movement detection in order to filter passive background movements.

3. The insulator apparatus according to claim 2, wherein the filter means comprises computer-based or software-based filter means.

4. The insulator apparatus according to claim 1, wherein the at least one work glove (14) is formed as a long-sleeve glove and the detection area (22) of the sensor means (16) is directed towards at least one sleeve portion of the long-sleeve glove.

5. The insulator apparatus according to claim 1, wherein the at least one radar sensor (24) having at least one receiving antenna and at least one transmitting antenna, which are disposed on a circuit board (26), and wherein the radar sensor (24) is formed for generating a radar signal in a frequency range of 60 GHz to 80 GHZ.

6. The insulator apparatus according to claim 5, wherein the at least one receiving antenna and the at least one transmitting antenna comprises four receiving antennas and three transmitting antennas.

7. The insulator apparatus according to claim 1, wherein the radar sensor (24) is formed as at least two sensor elements (17) disposed in a housing (28) in order to detect several access stations (32) of the manipulation chamber (12) and/or to detect several work gloves (14).

8. The insulator apparatus according to claim 7, wherein the at least two sensor elements (17) are disposed in pairs in the housing (28).

9. The insulator apparatus according to claim 1, wherein the at least one radar sensor (24) is sealed against environmental impacts in a housing (28), the housing preferably having a cover element (58), in particular a protective glass, transparent to radar beams in order to cover a detection portion (34) of the radar sensor (24).

10. The insulator apparatus according to claim 9, wherein the housing (28) is a two-part stainless steel housing.

11. The insulator apparatus according to claim 1, wherein the detection unit (20) is connected to a system control (40) in order to stop a manipulation process and/or to output a warning signal when the at least one work glove (14) is detected accessing a prohibited area of the manipulation chamber (12) and/or in order to set environmental operating parameters for a manual manipulation.

12. The insulator apparatus according to claim 11, wherein the detection unit (20) has a storage unit to log the detected access.

13. The insulator apparatus according to claim 1, wherein the detection unit (20) comprises at least one gateway (36) in order to be connected to at least one sensor element (17) of the sensor means (16) and a storage-programmable sensor control (38), several gateways (36) being connected to the sensor control (38) by means of a switch element (37).

14. A method for monitoring an insulator apparatus (10), the insulator apparatus (10) having a manipulation chamber (12) with sensor means (16), an operator (50) accessing the manipulation chamber (12) with at least one work glove (14) through at least one access opening (18) or the operator inserting the at least one work glove (14) into the access opening (18) to seal the manipulation chamber (12), the sensor means (16) being disposed at a distance to the access opening (18) in the manipulation chamber (12) and being connected to a detection unit (20), the method comprising the following steps:

directing a detection area (22) of the sensor means (16) towards at least one operating area of the at least one work glove (14) in the area of the access opening (18), the sensor means (16) being formed as at least one radar sensor (24) and the at least one radar sensor (24) being disposed in the manipulation chamber (24) such that and/or a radar signal being generated by selecting a suitable wavelength, such that a radiation cone (30) of the radar sensor (24), having at least one radar antenna and at least one transmitting antenna, covers at least the operating area of the work gloves (14) in the area of the access opening (18), and the radiation cone (30) of the at least one radar sensor (24) being directed towards at least two work gloves (14), detecting reflected sensor signals and evaluating the sensor signals by means of the detection unit (20), the radiation cone (30) being divided into at least a first and a second detection area (22*a*, 22*b*) for evaluation by means of the detection unit (20) using filter means in order to allocate reflected radar signals to individual work gloves (14), detecting an inserting and/or operating movement of the at least one work glove (14), with respect to a reference position of the work glove (14) and/or with respect to an object-free detection of the operating area, and/or a deviation from a passive movement pattern.

15. The method for monitoring an insulator apparatus (10) according to claim 14, wherein a signal detected by the detection unit (20) being sent to a system control (40) subsequently to a detection of the at least one work glove (14), in order to output a warning signal to the operator (50) and/or to stop or restrict further operation of the insulator apparatus (10) in the event of a manual access of the at least one work glove (14) into a prohibited area.

16. A computer program having program code means, said computer program being stored on a computer-readable data carrier in order to perform all steps of a method according to claim 14, wherein, when the computer program is executed on a computer or on a corresponding computer unit.

17. The method according to claim 14, wherein the sensor means (16) is an imaging sensor means.

* * * * *